(12) United States Patent
Bauman et al.

(10) Patent No.: US 6,728,835 B1
(45) Date of Patent: Apr. 27, 2004

(54) LEAKY CACHE MECHANISM

(75) Inventors: Mitchell A. Bauman, Circle Pines, MN (US); Conrad S. Shimada, Oakdale, MN (US); Kelvin S. Vartti, Hugo, MN (US); William L. Borgerding, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 320 days.

(21) Appl. No.: 09/650,730

(22) Filed: Aug. 30, 2000

(51) Int. Cl.$^7$ .......................... G06F 12/00; G06F 13/00
(52) U.S. Cl. ...................... 711/122; 711/133; 711/135; 711/136
(58) Field of Search .................. 711/118, 122, 711/133, 135, 136, 144

(56) References Cited

U.S. PATENT DOCUMENTS

| | | | |
|---|---|---|---|
| 4,928,239 A | * 5/1990 | Baum et al. ............ | 711/136 |
| 5,353,425 A | * 10/1994 | Malamy et al. .......... | 711/144 |
| 5,603,005 A | 2/1997 | Bauman et al. .......... | 395/451 |
| 5,625,793 A | 4/1997 | Mirza .................. | 395/465 |
| 5,809,524 A | * 9/1998 | Singh et al. ............ | 711/118 |
| 5,829,025 A | * 10/1998 | Mittal ................. | 711/122 |
| 6,202,125 B1 | * 3/2001 | Patterson et al. ........ | 711/118 |
| 6,202,129 B1 | * 3/2001 | Palanca et al. .......... | 711/133 |
| 6,338,119 B1 | * 1/2002 | Anderson et al. ......... | 711/135 |
| 6,484,230 B1 | * 11/2002 | Konigsburg et al. ....... | 711/100 |
| 6,490,654 B2 | * 12/2002 | Wickeraad et al. ........ | 711/133 |

* cited by examiner

*Primary Examiner*—Mano Padmanabhan
*Assistant Examiner*—Pierre M. Vital
(74) *Attorney, Agent, or Firm*—Charles A. Johnson; Mark T. Starr; Nawrocki, Rooney and Sivertson, P.A.

(57) ABSTRACT

An apparatus for and method of improving the efficiency of a level two cache memory. In response to a level one cache miss, a request is made to the level two cache. A signal sent with the request identifies when the requester does not anticipate a near term subsequent use for the requested data element. If a level two cache hit occurs, the requested data element is marked as least recently used in response to the signal. If a level two cache miss occurs, a request is made to level three storage. When the level three storage request is honored, the requested data element is immediately flushed from the level two cache memory in response to the signal.

17 Claims, 6 Drawing Sheets

LEAKY CACHE MECHANISM

CROSS REFERENCE TO CO-PENDING APPLICATIONS

The present invention is related to commonly assigned and co-pending U.S. patent application Ser. No. 09/651,598, filed Aug. 30, 2000, entitled "Split Control for IP Read and Write Cache Misses"; U.S. patent application Ser. No. 09/651,597, filed Aug. 30, 2000, entitled "Method for Avoiding Delays During Snoop Requests"; U.S. patent application Ser. No. 09/651,488, filed Aug. 30, 2000, entitled "Method for Managing Flushes within the Cache"; and U.S. patent application Ser. No. 09/650,800, filed Aug. 30, 2000, entitled "Method for Improved First Level Cache Coherency" which are incorporated herein by reference.

BACKGROUND OF THE INVENTION

1. Field of the Invention

The present invention generally relates to methods and apparatus for controlling a level two cache memory by multiple users and more particularly relates to controlling flushing of the level two cache memory.

2. Description of the Prior Art

It is known in the prior art to develop computer systems having cache memory(s) built into the basic architecture. The two fundamental characteristics of any memory unit are capacity (i.e., number of storage cells) and speed. The cost of a memory unit is, of course, increased with increased capacity and/or increased speed. Because of the time delays necessitated by increased size, memory systems which are both very large in capacity and very fast tend to be cost prohibitive.

Therefore, for virtually all general purpose computers, cost requirements dictate that the main storage subsystem will operate more slowly than the processor(s) which it serves. Therefore, there tends to be a constant mismatch between the rate at which data is to be accessed from the main storage subsystem and the rate at which that data is processed. Thus, a constant performance issue with computer design is related to reduction of the latencies associated with the wait between a processor request for memory access and the time when that request is actually honored by the main storage subsystem.

A common technique for matching a relatively high speed processor to a relatively low speed main storage subsystem is to interpose a cache memory in the interface. The cache memory is much faster but of much smaller capacity than the main storage subsystem. Data requested by the processor is stored temporarily in the cache memory. To the extent that the same data remains within the cache memory to be utilized more than once by the processor, substantial access time is saved by supplying the data from the cache memory rather than from the main storage subsystem. Further savings are realized by loading the cache memory with blocks of data located near the requested data under the assumption that other data will be soon needed from the loaded block.

There are additional issues to be considered with regard to cache memory design. Program instruction data, for example, tends to be quite sequential and involves only read accesses. However, operand data may involve both read and write accesses. Therefore, it is helpful to optimize cache memory design by dividing instruction processor cache memories into program instruction and operand portions.

Furthermore, if a computer system contains multiple processing units, provision must be made to ensure that data locations accessed by a first processing unit are provided as potentially modified by write operations from a second processor unit. This data coherency problem is usually solved via the use of store-through (i.e., write operands cause immediate transfer to main storage) or store-in (i.e., cache memory contains only updated data and flags are needed to show that main storage location contains obsolete data).

As the use of cache memory has become more common, it is now known to utilize multiple levels of cache memory within a single system. U.S. Pat. No. 5,603,005, issued to Bauman et al. on Feb. 11, 1997, incorporated herein by reference, contains a description of a system with three levels of cache memory. In the multiprocessor Bauman et al. system, each instruction processor has dedicated instruction (i.e., read-only) and operand (i.e., write-through) cache memories. This corresponds to level one cache memory.

A level two cache memory is located within each system controller. The level two cache memory of Bauman et al. is a store-in cache memory which is shared by all of the processors coupled to corresponding system controller. The system of Bauman et al. contains a level three cache which is coupled between each of the system controllers and a corresponding main memory unit.

It is axiomatic that the capacity of a cache memory is less than that of main storage. Therefore, after a period of time, a cache memory typically fills up completely necessitating a flushing of some of its contents before any new data may be added to the cache memory. For a store-in level two cache memory, such as taught by Bauman et al., data modified by input data from an input/output processor or an operand write from an instruction processor must be stored within the level three cache memory and/or main storage, because it is the most current data.

A primary key to efficiency within a cache memory architecture is the process whereby some of the data within a cache memory is chosen to be flushed to accommodate newly requested data. This is particularly important for the level two, store-in cache memory of Bauman et al., because the flushing process necessitates writing the changed data to the level three cache memory.

The most common technique known in the prior art for choosing which data to flush is called least recently used (LRU). This approach is based upon a determination of which data has been latent within the cache memory for the longest period of time without being utilized for processing. U.S. Pat. No. 5,625,793, issued to Mirza on Apr. 29, 1997, suggests a change in the LRU technique. Yet, these prior art approaches are suboptimal, thus reducing efficiency of the cache memory architecture.

SUMMARY OF THE INVENTION

The present invention overcomes many of the disadvantages associated with the prior art by providing a method of and apparatus for improving upon the least recently used algorithm for flushing of a level two cache memory. Though the least recently used algorithm may work just fine for many situations, there are circumstances wherein there is specific a priori knowledge that requested data will or will not be used again in the near future.

In accordance with the present invention, this a priori knowledge may be utilized to enhance the basic LRU determined flush activity of the level two cache memory. If it is known that the requested data is highly likely to be used again soon, the existing LRU algorithm ensures that the data will not be prematurely flushed from the level two cache memory. However, if it is known that reuse is highly unlikely, under normal operation of the LRU, the data would be aged within the level two cache, potentially causing more frequently used data to be flushed. Therefore, in accordance with the present invention, provisions are made to quickly dispose of the little used data quantity.

In accordance with the preferred mode of the present invention, certain write instructions are included within the processor repertoire which send a "release ownership" line to the system controller. This signal indicates that the data need not be maintained within the store-in level two cache. A similar instruction is the "read, no replace" instruction for read accesses.

With either case (i.e., release ownership write or read, no replace), the system controller is instructed not to unnecessarily maintain the accessed data with the level two cache memory. This results in one of two situations.

If there is a hit within the level two cache memory, the data access is made there, but the element is tagged as least (rather than most) recently used. That means that the system controller will flush that data element as soon as additional space is needed.

When the access request results in a cache miss, the request is made of the level three cache, as usual. However, as soon as the data is provided to the requesting instruction processor, the data element is flushed for a write request or not replaced in the cache for a read request.

Thus, in accordance with the present invention, the efficiency of the level two cache is improved, because knowingly unneeded data is not maintained within the limited storage at the expense of potentially more needed data. This means that, on the average, the more needed data will remain within the level two cache for longer periods of time.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
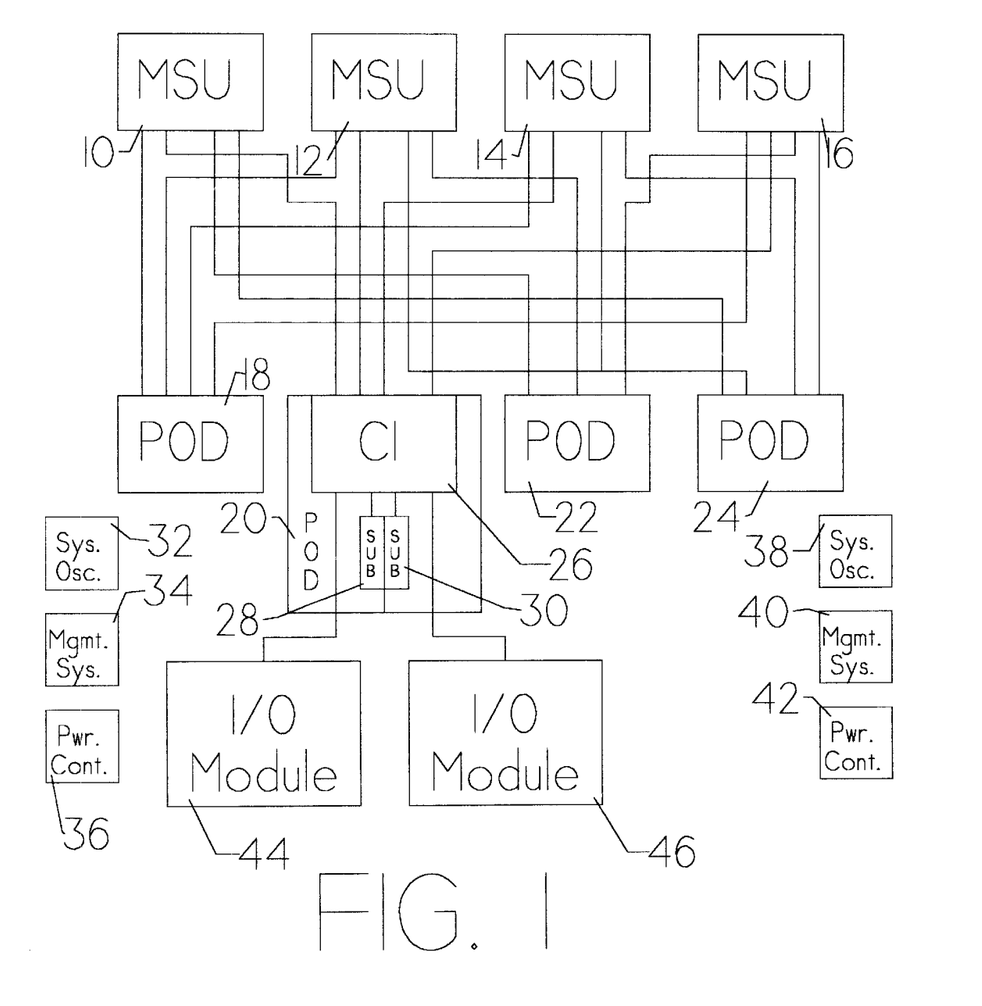
FIG. 1 is a functional block diagram of the overall architecture of the preferred mode of the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
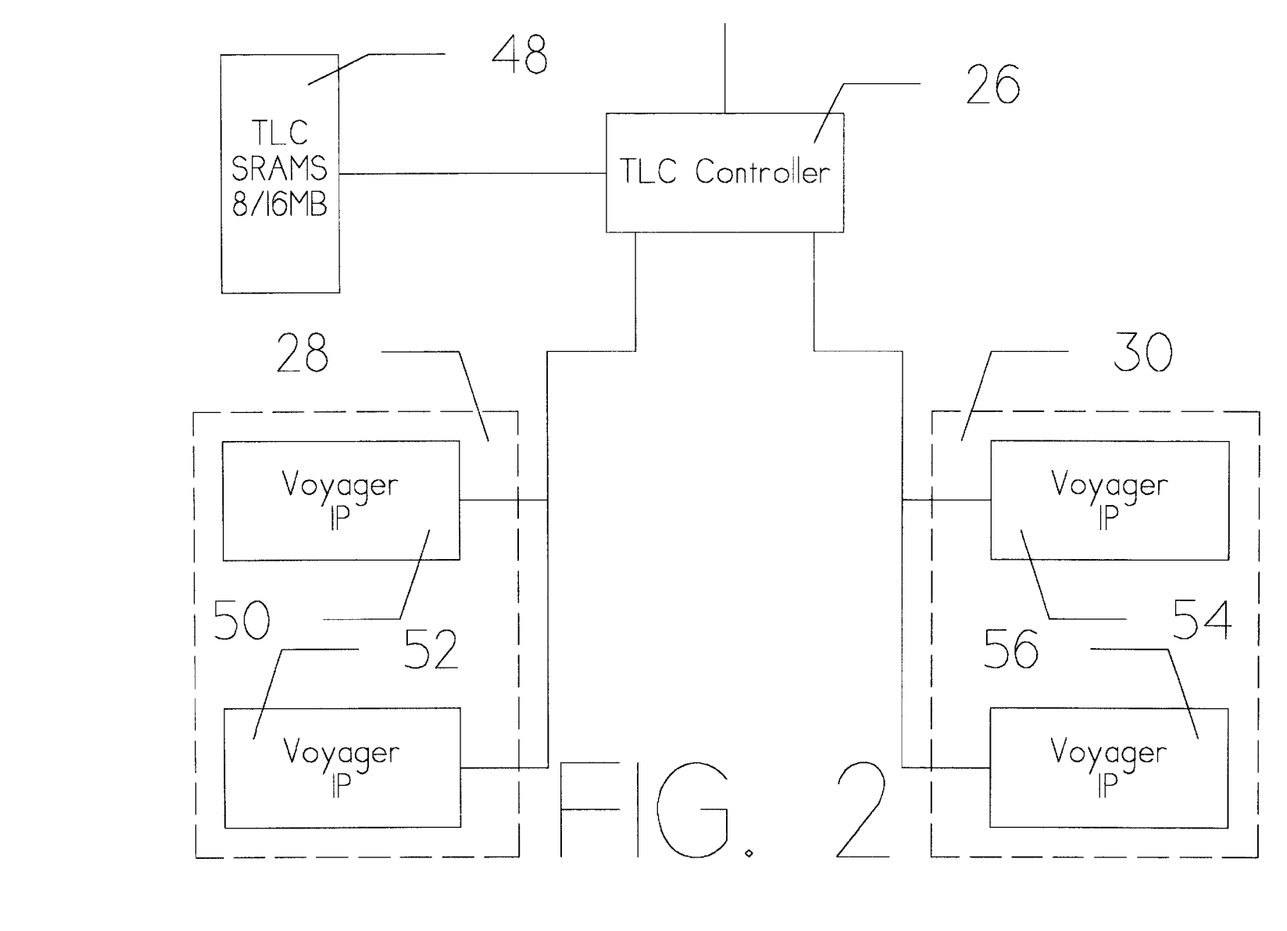
FIG. 2 is a more detailed functional block diagram of a single POD of the present invention.

FIG. 2 is a more detailed block diagram of POD 20. The level three cache memory interfaces directly with the memory storage units via TLC (Third Level Cache) Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
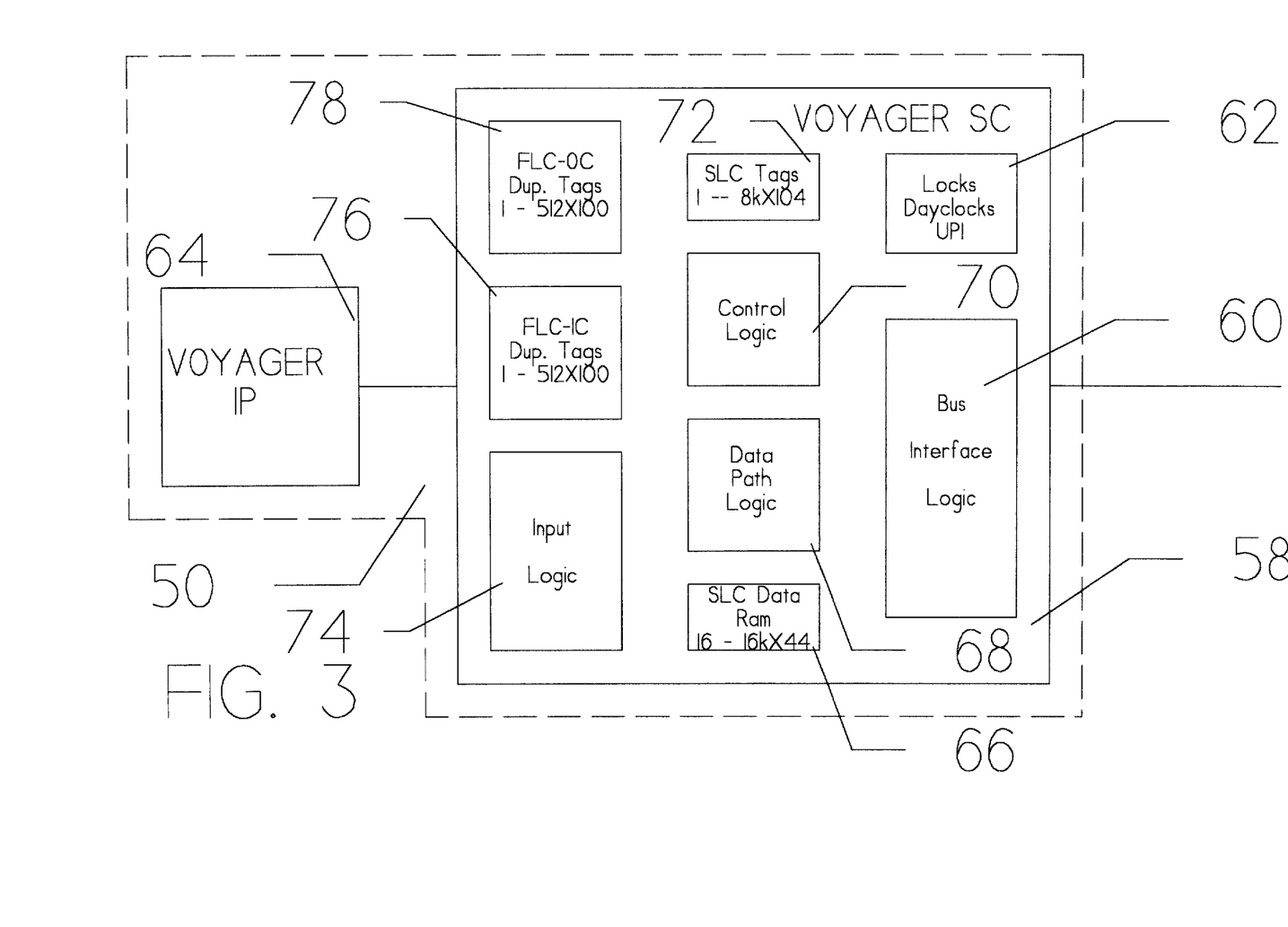
FIG. 3 is a detailed functional block diagram of an instruction processor with dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58. The utilitarian functions are provided by Locks, Dayclocks, and UPI (Uninterruptible Power Interface) 62.

The remaining elements of system controller 58 provide the level two cache memory functions. SLC (Second Level Cache) data RAM 66 is the data actual storage facility. Control logic 70 provides the cache management function. SLC tags 72 are the tags associated with the level two cache memory. FLC-IC (First Level Cache-Instruction Cache) Dup. Tags 76 provides the duplicate tags for the level one instruction cache memory of instruction processor 64. Similarly, FLC-OC (First Level Cache-Operand Cache) Dup. Tags 78 provides the duplicate tags for the level one operand cache memory of instruction processor 64. For a more complete discussion of this duplicate tag approach, reference may be made with the above identified co-pending and incorporated U.S. Patent Applications.

Figure 4:
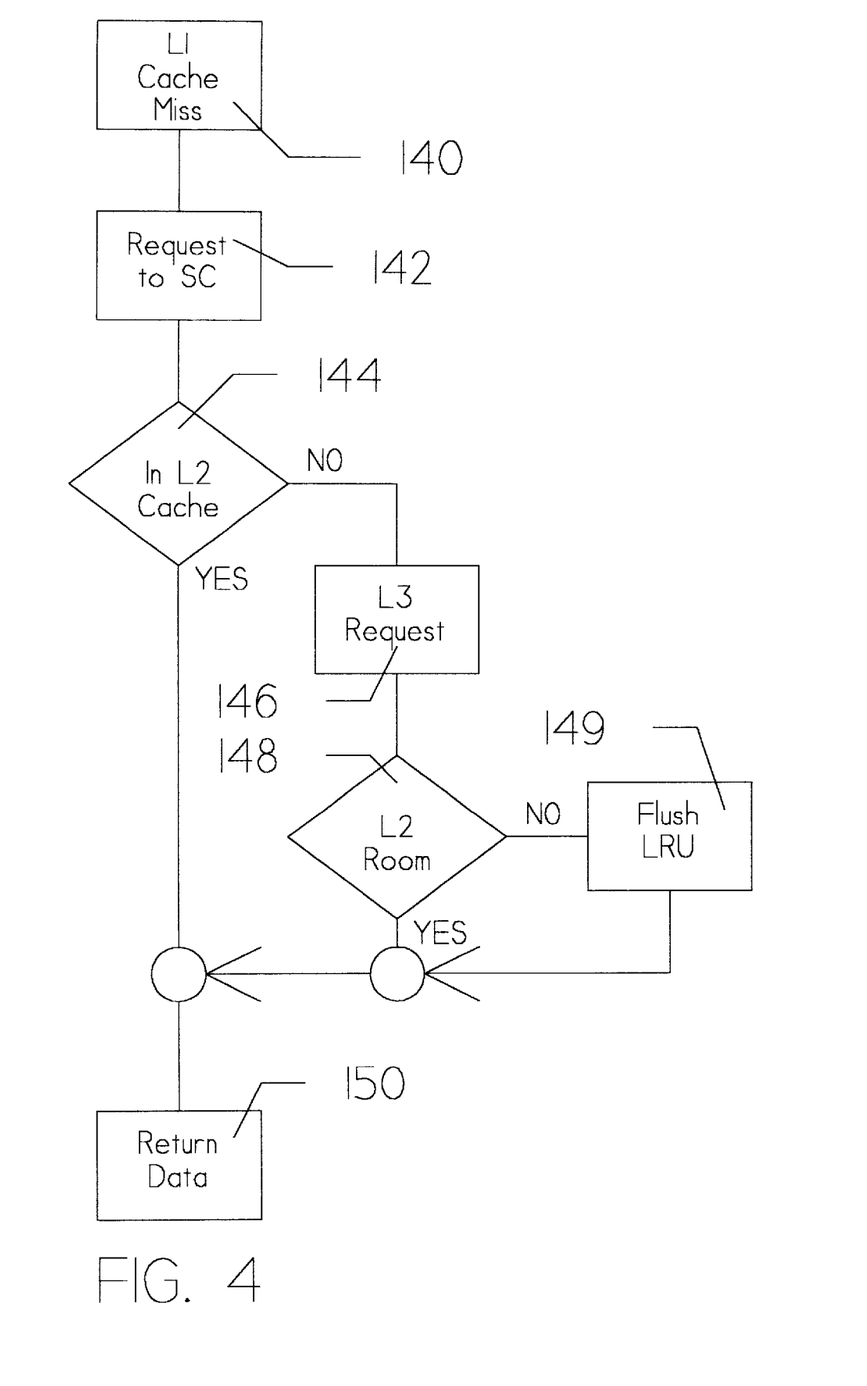
FIG. 4 is a flow chart showing maintenance at one interface to the level two cache memory.

FIG. 4 is a flow chart showing the normal process for handling a level one (i.e., dedicated processor) cache memory miss (see also FIG. 3). The level one cache memory miss is experienced at element 140 requiring a request from the processor to the system controller at element 142.

Control is given to the system controller at element 144 which determines whether the requested data is currently available within the level two cache memory of the system controller. If it is, the data is supplied to the requesting processor at element 150 and the process is complete.

If element 144 does not find the requested data within the level two cache memory, it must make a request for the data from the level three cache memory of the POD (see also FIG. 2) at element 146. This request may find the requested data within the level three cache memory or might necessitate an access of the much slower main storage unit. In either case, the process appears the same to the system controller except for the much longer access time if the level three cache memory request also results in a miss.

To store the requested data within the level two cache requires sufficient storage space. Element 148 determines whether there is sufficient free space currently. If yes, the data is loaded into the level two cache memory, and control is given to element 150 for providing the data to the requesting processor.

However, if element 148 does not find sufficient space within the level two cache memory, control is given to element 149 for generating sufficient free space by flushing the least recently used (LRU) data. Element 149 determines that data is least recently used if the level two cache memory logic shows that all other data within the level two cache memory has been accessed later than it. After element 149 performs the flush, generating sufficient free space, the process proceeds as described above. Because the level two cache memory of the preferred mode is a store-in cache memory, the flushing operation necessitates an automatic storing within the level three cache memory and possibly the main storage unit of any data which has been modified (i.e., location written into).

Figure 5:
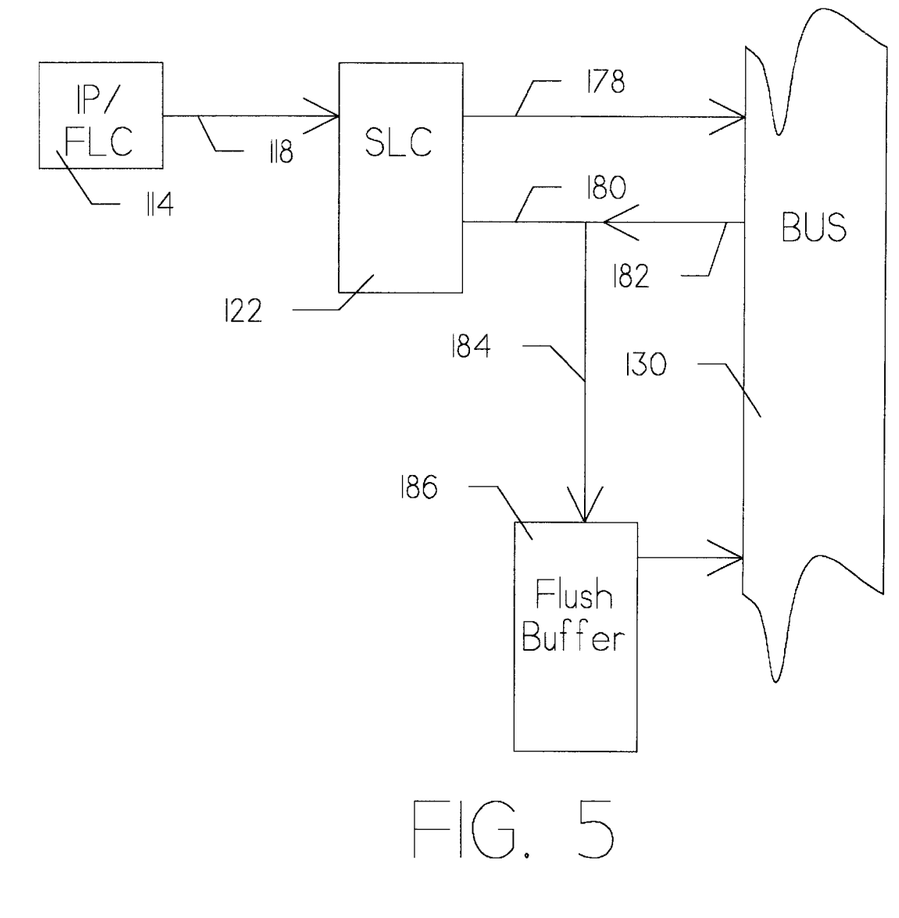
FIG. 5 is a detailed diagram showing movement of data element known not soon needed.

FIG. 5 is a detailed functional diagram of operation of the preferred mode of the present invention. Following a level one cache memory miss, a data request is made from level one operand cache memory 114 of the instruction processor via path 118 (see also FIG. 2). In accordance with the present invention, the data request is made along with setting of the release ownership line on memory bus 18. As explained above, this line is set for a write operation for which the requested data is not expected to be used again soon. Otherwise, the data request may be a read operation of the type read, no replace.

In either case, the data request has been indicated as one for which instruction processor will not have any immediate use. The request is forwarded to level two cache memory 122 located within the system controller.

If the requested data is found within second level cache memory 122 (i.e., a cache hit), the data access occurs. However, because the release ownership line is set, the data is marked as least recently used rather than as most recently used. As a result, though the requested data is not immediately flushed from second level cache memory 122, it will be flushed as soon as second level cache memory 122 needs space.

If a cache miss occurs within second level cache memory 122 (i.e., the data is not present), a level three cache memory request is made via path 178 and memory bus 130. As soon as the data is available, it is transferred from memory bus 130 via paths 182 and 180. However, the data is immediately flushed via path 184 and flush circuitry 186, because the release ownership line is set.

Figure 6:
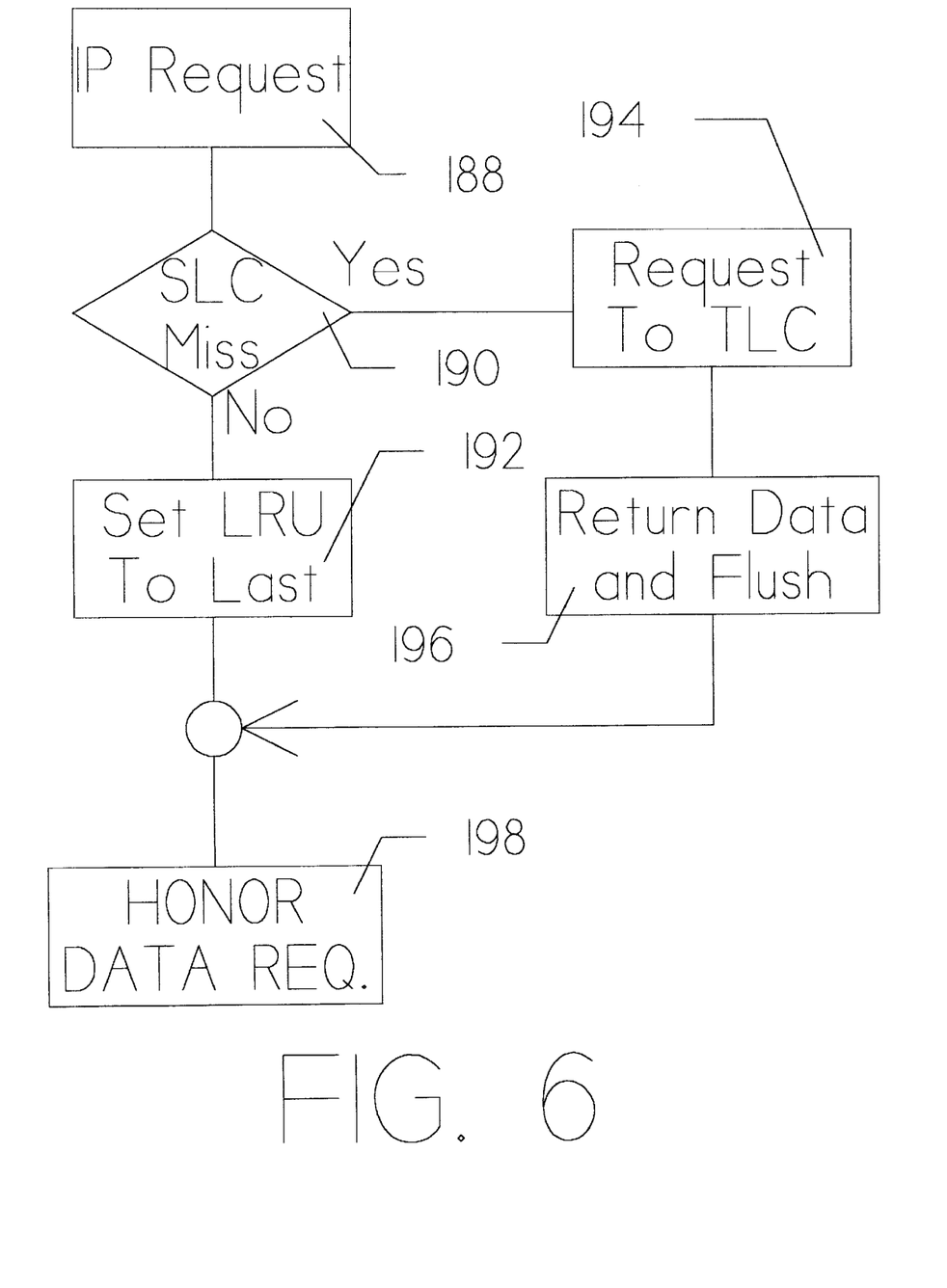
FIG. 6 is a detailed flow chart showing the logic of the operation of FIG. 5.

FIG. 6 is a flow diagram showing operation of the preferred mode of the present invention. Following a level one cache miss (see also FIG. 5), a data request is initiated at element 188. The data request is transferred to system controller (see also FIG. 3). Element 190 searches second level cache memory for the requested data. If the data is available, control is given to element 192 to designate the requested data as least recently used, rather than most recently used. Control is given to element 198 which honors the data request.

If element 190 determines that the requested data is not to be found within level two cache memory, control is given to element 194 which makes a corresponding data request of the level three cache memory. Whenever the request is honored, element 196 immediately flushes the requested data, because the release ownership line is set. Element 198 honors the initial data request.

Having thus described the preferred embodiments of the present invention, those of skill in the art will readily appreciate that the teachings found herein may be applied to yet other embodiments within the scope of the claims hereto attached.

We claim:

1. In a data processing system having a first processor, which executes a release ownership instruction, with a dedicated first level cache memory, the improvement comprising:

a. A dedicated system controller containing a dedicated second level cache memory whereby a cache miss within said dedicated first level cache memory results in a data request to said dedicated system controller;

b. A release ownership signal associated with said release ownership instruction to indicate that said first processor does not soon expect to utilize said requested data a second time by marking said requested data as least recently used within said dedicated system controller upon a cache hit within said second level cache memory;

c. a second processor and a shared third level storage unit wherein a cache miss of said dedicated second level cache memory results in a subsequent data request to said shared third level storage unit; and d. wherein said data request is immediately flushed from said dedicated second level cache memory after said shared third level storage unit honors said subsequent requested data only if said release ownership signal is present and said instruction is a write instruction.

2. The improvement according to claim 1 wherein said data request causes a search of said dedicated second level cache memory.

3. The improvement according to claim 2 wherein said data request is not stored in said dedicated second level cache memory when said shared third level storage unit honors said subsequent requested data only if said release ownership signal is present and said instruction is a read instruction.

4. An apparatus comprising:
   a. A processor which executes an instruction having a dedicated first level cache memory wherein a cache miss results in a data request;
   b. A dedicated system controller including a dedicated second level cache memory responsively coupled to said dedicated first level cache memory Wherein said data request results in a determination of second level cache miss or second level cache hit;
   c. A release ownership signal associated with said instruction transferred along with said data request to said dedicated system controller whereby said processor indicates that said requested data is not anticipated to be subsequently utilized soon;
   d. a shared third level storage unit responsively coupled to said dedicated second level cache memory wherein said second level cache miss results in a subsequent data request honored by said shared third level storage unit; and
   e. wherein said data request, said honored subsequent data request, and said release ownership signal in combination results in a flushing of said requested data at said dedicated second level cache memory only if said instruction is a write instruction.

5. An apparatus according to claim 4 wherein said data request, said second level cache hit, and said signal in combination results in said requested data being identified as least recently used.

6. An apparatus according to claim 5 wherein said dedicated second level cache memory further comprises a store-in cache memory.

7. A method comprising:
   a. querying a dedicated first level cache memory for a data element in response to execution of an instruction by a processor;
   b. making a data request of a dedicated system controller having a dedicated second level cache memory if said querying step results in a cache miss;
   c. signaling said dedicated system controller via a release ownership signal if said instruction has no anticipation that said data element will not be subsequently used soon;
   d. initiating a subsequent data request to a shared third level storage unit in response to a second level cache memory miss;
   e. honoring said subsequent data request within said shared third level storage unit; and
   f. flushing said data element from said dedicated second level cache memory in response to said release ownership signal and following said honoring step only if said instruction is a write instruction.

8. A method according to claim 7 further comprising:
   a. querying said dedicated system controller for said data element in response to said data request.

9. A method according to claim 8 further comprising:
   a. marking said data element as least recently used within said dedicated system controller in response to presence of said signaling and a second level cache hit.

10. An apparatus comprising:
    a. means for providing a dedicated second level cache memory;
    b. means responsively coupled to said providing means for requesting a data element from said providing means in response to execution of an instruction;
    c. means responsively coupled to said requesting means and said providing means for signaling said providing means via a release ownership signal that said data element is not likely to be subsequently needed soon;
    d. means responsively coupled to said providing means for storing shared main storage data; and
    e. means responsively coupled to said storing means and said providing means for flushing said data element from said dedicated second level cache memory in response to said transferring means and said signaling means only if said instruction is a write instruction.

11. An apparatus according to claim 10 further comprising:
    a. means responsively coupled to said providing means for indicating that said data element is least recently used within said dedicated second level cache memory if said data element is present within said dedicated second level cache memory.

12. An apparatus according to claim 10 further comprising:
    means responsively coupled to said providing means and said storing means for requesting said data element from said storing means if said dedicated second level cache memory does not contain said data element.

13. An apparatus according to claim 12 further comprising:
    a. means responsively coupled to said storing means and said providing means for transferring said data element to said providing means from said storing means in response to said requesting.

14. An apparatus comprising:
    a. a first processor which executes an instruction causing a data request;
    b. a dedicated first level cache memory responsively coupled to said first processor which receives said data request;
    c. a dedicated system controller responsively coupled to said first processor which receives said data request if said dedicated first level cache memory cannot honor said data request;
    d. a dedicated second level cache memory located within said dedicated system controller;
    e. a release ownership signal corresponding to said instruction generated by said first processor and responsively coupled to said dedicated system controller;
    f. a first logic circuit located within said dedicated system controller which marks said requested data as least recently used if said data request is honored by said second level cache memory; and
    q. a second logic circuit located within said dedicated system controller which inhibits storage of said data request within said dedicated second level cache memory if said instruction is a read instruction.

15. An apparatus according to claim 14 further comprising:
    a second processor; and
    a shared third level memory responsively coupled to said second processor and said dedicated system controller which receives said data request if said dedicated system controller cannot honor said data request.

16. An apparatus according to claim 15 further comprising:
    j. a third logic circuit located within said dedicated system controller which automatically flushes said data request from said dedicated second level cache memory if said instruction is a write instruction.

17. An apparatus according to claim 16 wherein said read instruction is read no replace instruction.

* * * * *